J. B. McMULLEN.
WINDSHIELD ATTACHMENT.
APPLICATION FILED JAN. 23, 1920.
1,434,714.
Patented Nov. 7, 1922.
2 SHEETS—SHEET 1.
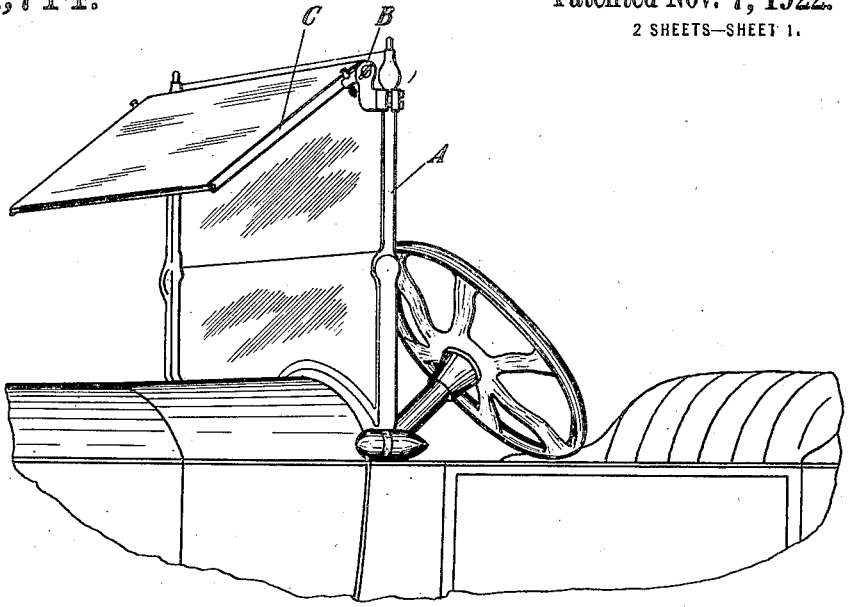
Fig. 1.
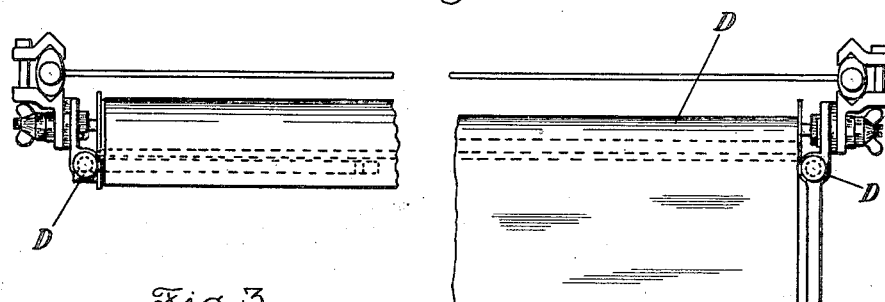
Fig. 3.
Fig. 2.
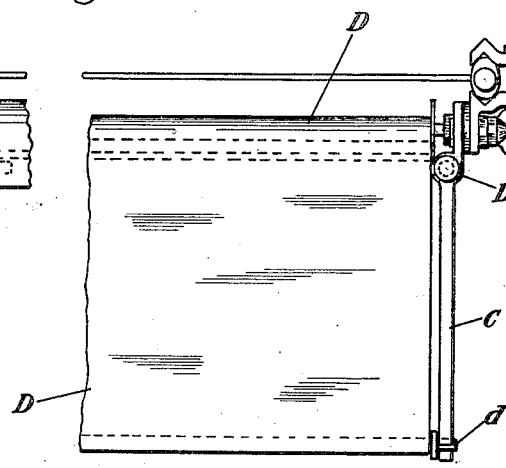
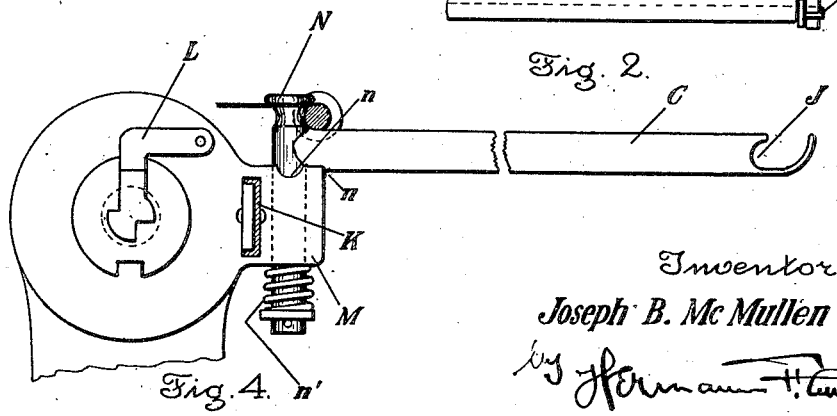
Fig. 4.
Inventor:
Joseph B. McMullen
Attorney.

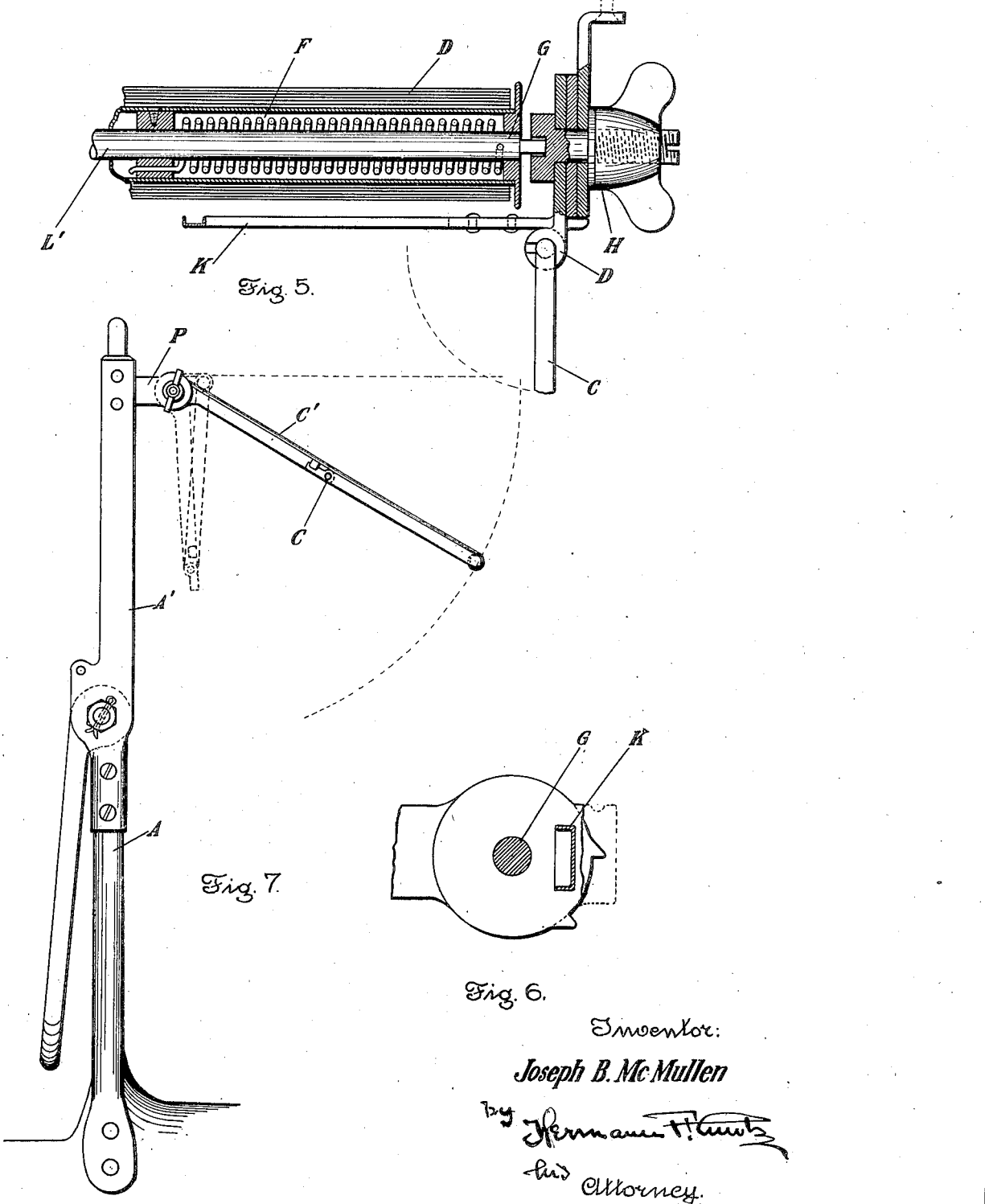

Patented Nov. 7, 1922.

1,434,714

UNITED STATES PATENT OFFICE.

JOSEPH B. McMULLEN, OF CATONSVILLE, MARYLAND, ASSIGNOR TO ACME MOTOR SHIELD CORPORATION, OF BALTIMORE, MARYLAND, A CORPORATION OF DELAWARE.

WINDSHIELD ATTACHMENT.

Application filed January 23, 1920. Serial No. 353,414.

*To all whom it may concern:*

Be it known that I, JOSEPH B. McMULLEN, a citizen of the United States, residing in the city of Catonsville, county of Baltimore, State of Maryland, have invented certain new and useful Improvements in Windshield Attachments, of which the following is a specification, reference being had to the accompanying drawings, illustrative of one particular embodiment of my invention.

This invention relates to windshields such as are used on automobiles, and has particularly for its object the provision of means to shield the pilot or occupant against a front glare of light and also to protect the usual glass or transparent windshield portion so as to prevent the accumulation of moisture, snow and the like.

A particular embodiment of my invention is shown in the accompanying drawings, in which:

Fig. 1 is a perspective view of a shield shown on a car.

Fig. 2 is a front view, fragmentary, of the shield embodying my invention.

Fig. 3 is a fragmentary view of the same shown collapsed or housed.

Fig. 4 is a side view showing the shield arm in detail.

Fig. 5 is a view of the shield in section on its axis.

Fig. 6 shows the joint of the shield arm with the locking means.

Fig. 7 is a side elevation of the shield arm in a modified form.

In the drawings the regular windshield arm A is supplied with a bracket B with an arm C pivotally attached thereto, having a joint D to permit lateral collapsing of the same. A suitable limp material O forms an opaque sheathing adapted to be rolled up on the roller E by automatic means such as the spring F, on a shaft G suitably supported and positioned by a pivot block or bearing H, readily demountable or adjustable.

In the end of the arm C is a notch J into which the end *d* of the shield D may engage to hold the opaque shield portion in extended position subject to the tension of the spring F. A cross-member K extends in front of the shaft G and roller as a distance bar for the end bearing and to stiffen the entire structure.

In Fig. 4 the member L serves to lock the roller shaft while the offset M serves as a pivot support for the arm C, having at its upper end the stud N adapted to engage the end-pin *d* of the shield in folded position. Notches *n* serve to position the arm C in out-stretched or folded position by the co-operation of the spring *n'* at the opposite end of the stud N.

The form shown in Fig. 7 has the member A' pivoted to the permanent stanchion A, with a permanent offset P at the upper end supporting the arm C', which in this form is hinged at *c* so that instead of a lateral folding the arm C may be doubled up into a vertical position bringing the edge of the roller to the full height so as not to obscure the view.

It will thus be seen that I provide a means for combining a shield which is opaque and will, therefore, shield the driver against the sun or reflections or bright portions on the front of a car,—and which may be adjusted within the limits of desired position, and may at any time be collapsed and housed or folded in, forming no obstruction whatsoever to the vision, while still being protected in that position against accidental damage.

In the mounting, my invention involves provision for the substantial support against the great strain of wind which is always involved when such a supplementary shield is in an inclined position, affording wind resistance with the speed of motion of the car. The spring tension is adjusted by the construction as shown, to resist any undesirable deflection due to the pressure of the wind; while in its extended position adjustment may be made so that the limit of the spring-held roll forms a positive and secure anchor for the rolled end of the opaque screen.

While the invention has been called a windshield attachment it will be understood that the word attachment is used merely in the sense of accessory and the use of the device with a windshield is contemplated irrespective of whether it is attached directly to the windshield or to a portion of a car adjacent the windshield. In any event the device serves as a visor for the windshield.

While my invention may be modified in many respects and in design, dimensions and material, from what I have herein shown and described,—what I claim and desire to secure by Letters Patent is:

1. A supplemental adjustable shield for an automobile comprising a roller supporting an extendable and retractable opaque member, a plate at either end thereof supporting said roller, a distance rod between said pair of plates rigidly secured thereto to hold the same in fixed relation and adjustable with said plates around the roller, arms pivoted to said plates to support the edge of said shield in extended position and adapted to be folded, a second plate at either end outside of said first-mentioned plates and a bracket and clamping means associated therewith to attach the supplemental shield, and means to lock said inner and outer plates in varying positions of adjustment substantially about the axis of the roller.

2. A visor for automobile windshields, comprising an extensible and retractable member, a roller for said member, a frame supporting said roller, said frame comprising end plates and a distance member rigidly secured to said plates, arms for supporting said first named member in its extended position mounted on said frame for radial adjustment about said roller, said distance member maintaining said arms in parallelism.

3. An automobile windshield attachment comprising, in combination, a pair of brackets, a frame adjustably pivoted upon said brackets comprising spaced end plates and a member rigidly secured to said end plates, arms pivoted upon said frame adapted to fold to a position substantially parallel with said member, a spring roller rotatably mounted upon said frame, a curtain of opaque material mounted on said roller and means carried by said arms to hold said curtain in extended position.

4. In an automobile windshield attachment, in combination, a frame comprising spaced end plates and a member rigidly secured to said plates, a bracket adjustably pivoted to each plate for support of the device, means to hold said frame and brackets in adjusted angular relation, a pair of arms pivotally mounted upon said frame foldable to a position substantially parallel therewith, means to hold said arms in folded position, a spring roller rotatably mounted upon said frame, a flexible curtain of opaque material mounted upon said roller and means upon said arms to hold said curtain in extended position.

5. In an automobile windshield attachment, in combination, a frame comprising spaced end plates and a member rigidly secured to said plates, a bracket adjustably pivoted to each plate for support of the device, means to hold said frame and brackets in adjusted angular relation, a pair of arms pivotally mounted upon said frame foldable to a position substantially parallel therewith, means to hold said arms in folded position, a spring roller rotatably mounted upon said frame, a flexible curtain of opaque material mounted upon said roller, means upon said arms to hold said curtain in extended position, a rigid member secured to the edge of said curtain, means upon said frame to retain said member when said curtain is furled.

In testimony whereof, I have signed my name to this application, in the presence of two subscribing witnesses, this 14 day of January, 1920.

JOSEPH B. McMULLEN.

Witnesses:
HARRY HAESLOOP,
FRANCIS S. STIERTZ.